Patented Feb. 29, 1944

2,343,198

UNITED STATES PATENT OFFICE 2,343,198

N-ALKAMINE SUBSTITUTED DERIVATIVES OF PHTHALIMIDE

Marjorie B. Moore, Waukegan, Ill., assignor to Abbott Laboratories, North Chicago, Ill., a corporation of Illinois No Drawing. Application April 3, 1940, Serial No. 327,637

8 Claims. (Cl. 260—326)

The present invention relates to therapeutic products, and has as its principal object to provide the medical art with products possessing unique pharmacological properties.

The compounds falling within the scope of the present invention are N-substituted phthalimides and may be represented by the following general formula:

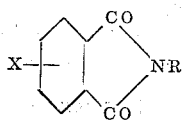

in which X represents H or $NH_2$, and R is an alkamine residue including:

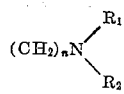

or

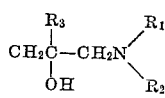

where $R_1$ and $R_2$ are alkyl groups or together form a heterocyclic ring, and $R_3$ represents H or $CH_3$.

The compounds of the present invention thus include: the aminophthalimides as well as the phthalimides; the amino alkyl (e. g. methyl, ethyl, propyl, butyl, amyl, hexyl, etc.)-phthalimides as well as the corresponding amino-alkanol-phthalimides; and various di-alkyl, cyclo-alkyl and heterocyclic amino-alkyl and alkanol-phthalimides. The compounds of the present invention which have been found to possess unique local anesthetic effects may be illustrated by the following typical examples:

EXAMPLE I.—*N-β-diethylaminoethyl-phthalimide*

About 0.1 mol of diethylaminoethyl chloride hydrochloride dissolved in alcohol is first mixed with about 0.1 mol of KOH in alcohol to obtain the free base. In this solution is next suspended about 0.1 mol of potassium phthalimide and the resulting mixture then refluxed with stirring for about 4 hours. The free base obtained by the above reaction may be converted to the salts in the usual manner. The N-β-diethylaminoethyl-phthalimide hydrochloride precipitated from ether solution as white crystals melts at about 235–236° C.

EXAMPLE II.—*N-β-di-n-butylaminoethyl-phthalimide*

About 0.1 mol of β-di-n-butylaminoethyl chloride (B. Pt. 131° C. at 46 mm.; prepared by reacting the alkylaminoethanol with thionyl chloride) and about 0.1 mol of potassium phthalimide are first suspended in absolute alcohol and then refluxed with stirring for about 11 hours. The free base obtained by the above reaction does not solidify at room temperature but distills at 170–177° C. at 2.5 mm.

EXAMPLE III.—*N-zeta-morpholinohexyl-phthalimide*

N-zeta-bromohexylphthalimide and morpholine in molar proportions are mixed in dry benzene and then refluxed for 11 hours in accordance with the above examples. The free base obtained is a buttery solid which melts at about 40–42° C.

EXAMPLE IV.—*N-gamma-di-n-butylaminopropyl-4-amino-phthalimide*

Gamma-bromopropyl-4-nitrophthalimide is reacted with di-n-butyl-amine to form di-n-butyl-aminopropyl-4-nitro-phthalimide. This product is then reduced by stannous chloride to the corresponding 4-aminophthalimide.

Another method for preparing this compound is by the reaction of 4-aminophthalimide with 1 mol each of di-n-butylaminopropyl chloride and KOH in absolute alcohol. The free base obtained is a yellowish waxy solid which decomposes on heating and does not have a definite melting point. The hydrochloride salt precipitated by dry hydrogen chloride from solutions of the base in organic solvents is a bright yellow hygroscopic crystalline product.

EXAMPLE V.—*N-gamma-diethylamino-β-methyl-β-hydroxypropyl-phthalimide*

This product is prepared by reacting diethylamino-β-methyl-epihydrin with phthalimide or by reacting 3-diethylamino-2-methyl-2-hydroxy-propylamine-1 with phthalic anhydride using heat in accordance with the general processes outlined above. The free base is liquid at room temperature. The hydrochloride salt is a very hygroscopic solid which, after drying in a vacuum desiccator melts at about 60–65° C. with decomposition.

The salts including the phosphate and sulphate as well as the hydro-halide, e. g. hydrochloride, hydrobromide, etc. of the compounds of the present invention are effective local anesthetics. Those with smaller alkyl groups are effective in wheals, but the heavier groups are ordinarily preferred to confer marked activity as topical anesthetics. The therapeutic ratio in general is as good as found in the procaine series.

It will be understood that the present invention is not limited to the above illustrative examples. All modifications coming within the scope of the present invention are intended to be covered by the following claims.

I claim:

1. A local anesthetic product, including the base and salts thereof, in which the base has the following general formula:

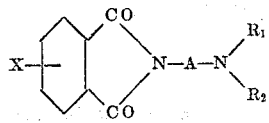

in which A represents a member selected from the group consisting of alkylene and hydroxy alkylene groups, $R_1$ and $R_2$ separately represent alkyl groups which may be connected to form a heterocyclic group, and X represents a substituent on the phthalimide ring selected from the group consisting of H and $NH_2$, the phthalimide ring of said product having an $NH_2$ substituent when A is an alkylene group and being free from such $NH_2$ substituent when A represents an hydroxy alkylene group.

2. A local anesthetic, dialkylaminoalkyl-aminophthalimide.

3. A local anesthetic, dialkylaminohydroxyalkyl-phthalimide.

4. A local anesthetic product in which the base thereof has the following formula:

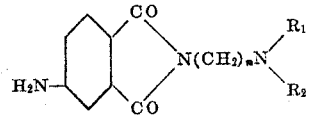

where $n$ represents a small whole number and $R_1$ and $R_2$ separately represent alkyl groups which may be connected to form a heterocyclic group.

5. A local anesthetic product in which the base has the following formula:

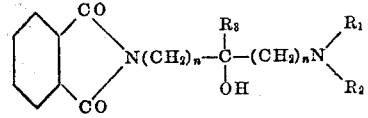

where $R_1$ and $R_2$ separately represent alkyl groups which may be connected to form a heterocyclic group, $R_3$ is selected from the group consisting of hydrogen and alkyl groups and the $n$'s represent small whole numbers.

6. The products N-gamma-di-n-butylamino-propyl-4-aminophthalimide and its hydrochloride salt, said products being characterized by local anesthetic properties.

7. The products N-gamma-diethylamino-β-methyl-β-hydroxy-propyl-phthalimide and its hydrochloride salt, said products being characterized by local anesthetic properties.

8. The products N-gamma-di-n-butylamino-β-methyl-β-hydroxy-propyl-phthalimide and its hydrochloride salt, said products being characterized by local anesthetic properties.

MARJORIE B. MOORE